(12) United States Patent
McKinnon et al.

(10) Patent No.: US 11,001,188 B2
(45) Date of Patent: May 11, 2021

(54) AWNING HEADER WITH INTEGRAL MARKER LIGHTS AND/OR CAMERA

(71) Applicant: LIPPERT COMPONENTS, INC., Elkhart, IN (US)

(72) Inventors: Scott C. McKinnon, Union City, MI (US); Josh Black, Mishawaka, IN (US); Michael Fiwek, Nappanee, IN (US); Byron Brown, Middlebury, IN (US); Brian Worthman, Goshen, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 297 days.

(21) Appl. No.: 16/013,001

(22) Filed: Jun. 20, 2018

(65) Prior Publication Data

US 2018/0361905 A1 Dec. 20, 2018

Related U.S. Application Data

(60) Provisional application No. 62/522,366, filed on Jun. 20, 2017.

(51) Int. Cl.
| | |
|---|---|
| *B60P 3/34* | (2006.01) |
| *E04H 15/08* | (2006.01) |
| *E04H 15/10* | (2006.01) |
| *B60Q 1/30* | (2006.01) |
| *B60Q 1/00* | (2006.01) |
| *B60Q 1/26* | (2006.01) |
| *B60R 11/04* | (2006.01) |
| *B60R 11/00* | (2006.01) |

(52) U.S. Cl.
CPC ............ *B60P 3/343* (2013.01); *B60Q 1/0023* (2013.01); *B60Q 1/2661* (2013.01); *B60Q 1/30* (2013.01); *B60R 11/04* (2013.01); *E04H 15/08* (2013.01); *E04H 15/10* (2013.01); *B60R 2011/004* (2013.01)

(58) Field of Classification Search
CPC ......... B60P 3/343; E04H 15/08; E04H 15/10; B60Q 1/30; B60Q 1/0023; B60Q 1/2661; B60R 11/04; B60R 2001/004
USPC ......... 296/37.7, 159, 160, 161, 163, 187.13, 296/193.12
See application file for complete search history.

(56) References Cited

U.S. PATENT DOCUMENTS

| | | | |
|---|---|---|---|
| 4,171,013 | A | 10/1979 | Clark |
| 4,191,418 | A | 3/1980 | Ladegast, Jr. |
| 4,474,403 | A | 10/1984 | Miller |
| 4,801,119 | A | 1/1989 | Pelletier |
| 4,821,987 | A | 4/1989 | Haman |
| 4,941,524 | A | 7/1990 | Greer |
| 5,163,460 | A | 11/1992 | Miller |
| 5,192,111 | A | 3/1993 | Hanemaayer |
| 5,423,506 | A | 6/1995 | Spoon |

(Continued)

*Primary Examiner* — Justin V Lewis
(74) *Attorney, Agent, or Firm* — Nixon & Vanderhye P.C.

(57) ABSTRACT

An awning system includes a housing connectable to a rear of a vehicle and an awning canopy extendable from and retractable into the housing. In an embodiment, a plurality of marker lights is integrated with the housing and oriented to project light in a rearward direction when the housing is attached to the rear of the vehicle. In another embodiment, a rear-facing camera is integrated with the housing and oriented to have a field of view covering an area rearward of the vehicle and below the canopy.

15 Claims, 6 Drawing Sheets

(56) References Cited

U.S. PATENT DOCUMENTS

| | | |
|---|---|---|
| 5,597,006 A | 1/1997 | Simonetti |
| 5,622,214 A | 4/1997 | Baka et al. |
| 5,636,675 A | 6/1997 | Baka et al. |
| 5,813,424 A | 9/1998 | Simonetti |
| 5,823,216 A | 10/1998 | Simonetti |
| 6,029,732 A | 2/2000 | Malott |
| 6,131,990 A | 10/2000 | Crean |
| 6,494,246 B1 | 12/2002 | Blevins |
| 6,619,726 B2 | 9/2003 | Jones |
| 6,782,936 B1 | 8/2004 | Girard et al. |
| 7,055,890 B1 | 6/2006 | Crean |
| 7,114,543 B2 | 10/2006 | Heitel |
| 7,163,257 B2 | 1/2007 | Heitel |
| 7,234,760 B1 | 6/2007 | Crean |
| 8,752,606 B2 | 6/2014 | Albrecht et al. |
| 8,950,460 B2 | 2/2015 | Worthman et al. |
| 9,175,481 B2 | 11/2015 | Albrecht et al. |
| 9,353,529 B2 | 5/2016 | Richmeier |
| 9,637,943 B2 | 5/2017 | Fiwek et al. |
| 2005/0206181 A1* | 9/2005 | Sagi .................... E04F 10/0685 296/37.7 |
| 2018/0194346 A1* | 7/2018 | Gesch .................... B60W 50/14 |

* cited by examiner

US 11,001,188 B2

AWNING HEADER WITH INTEGRAL MARKER LIGHTS AND/OR CAMERA

CROSS-REFERENCE TO RELATED APPLICATION

This application claims benefit under 35 U.S.C. § 119 of U.S. Provisional Patent Application No. 62/522,366, filed on Jun. 20, 2017, and incorporates by reference the disclosure thereof in its entirety.

BACKGROUND AND SUMMARY OF THE DISCLOSURE

Federal Motor Vehicle Safety Standard 108 requires certain vehicles having an overall width of 80 inches or more to include clearance and identification lights (sometimes referred to herein individually or collectively as marker lights) mounted on the rear of the vehicle as near as practicable to the top of the vehicle. Many recreational vehicles and trailers have an overall width of 80 inches or more and, therefore, are subject to the foregoing requirement.

Many recreational vehicles and trailers subject to the foregoing requirement include a rear ramp door that may be opened to a ramp configuration to facilitate loading and unloading of articles to and from the interior of the vehicle. In some instances, the ramp door also may be opened to a horizontal configuration in which the door may be used as a patio deck.

In order to minimize the angle of the door to the floor of the vehicle and to the ground when the door is opened to the ramp configuration, it may be desirable to make the door as long as possible. Similarly, in order to maximize the size of the patio deck when the door is in the horizontal configuration, it may be desirable to make the door as long as possible. As such, it may be desirable to extend the door as close as practicable to the top of the vehicle, leaving very little space for installation of marker lights.

Also, it may be desirable to provide an overhead canopy or awning to shade the patio deck when the door is in the horizontal configuration. Such an overhead canopy or awning, however, typically would be contained within and deployable from a housing that would need to be mounted to the rear of the vehicle header in the same space where the marker lights must be located.

As such, maximizing the door length may preclude installation of an awning, and installation of an awning may require compromising the door length.

Further, it is becoming more common for a recreational vehicle to be equipped with a rear-facing camera to better enable an operator to see behind the vehicle to facilitate reversing operations. Such cameras, however, typically are provided as discrete units that are mounted to the rear of the vehicle using brackets and the like. Such mountings, however, may be less than sturdy, and they may located such they may be readily impacted by activities about the vehicle, and inadvertently reoriented so that they no longer face the intended direction. Also, if the vehicle includes a ramp door, as discussed above, there may not be sufficient room to mount a camera on the rear of the vehicle other than on the door or above it. Further, such cameras often are placed where their fields of view are obstructed by articles, for example, bicycles, cargo carriers, and like carried on the rear of the vehicle.

DETAILED DESCRIPTION OF THE DRAWINGS

References to orientation, for example, front, rear, forward, rearward, left, right, upper lower, top, bottom, and the like, herein should be construed in a relative, rather than absolute, sense. Such references typically are made with respect to a recreational vehicle or trailer configured and oriented for normal operation on a roadway.

Figure 1:
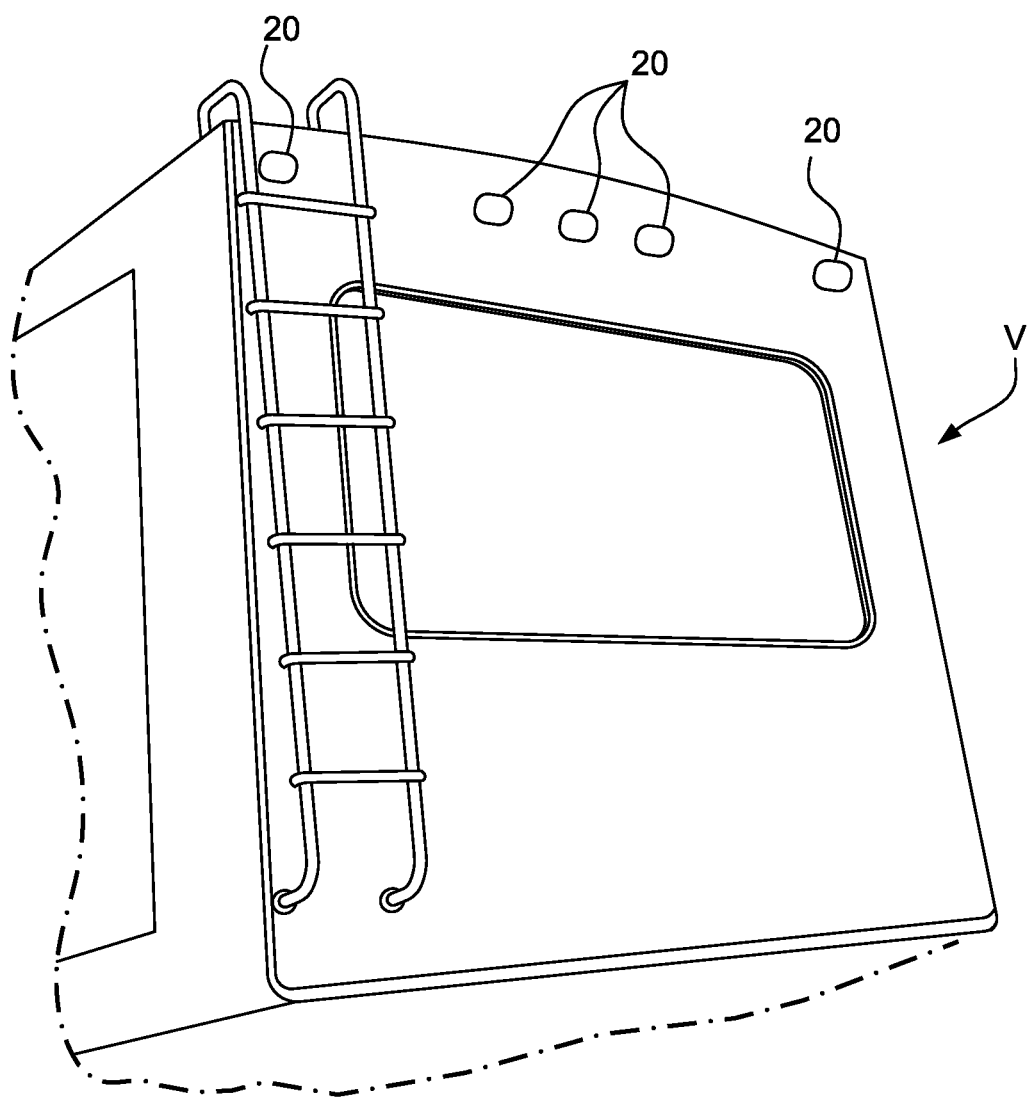
FIG. 1 is a photograph of the rear of a vehicle having marker lights mounted on the rear of vehicle and near the top of the vehicle.

FIG. 1 is a photograph of the rear of a vehicle V having marker lights 20 mounted on a rear surface of the vehicle and near the top of the vehicle.

Figure 2:
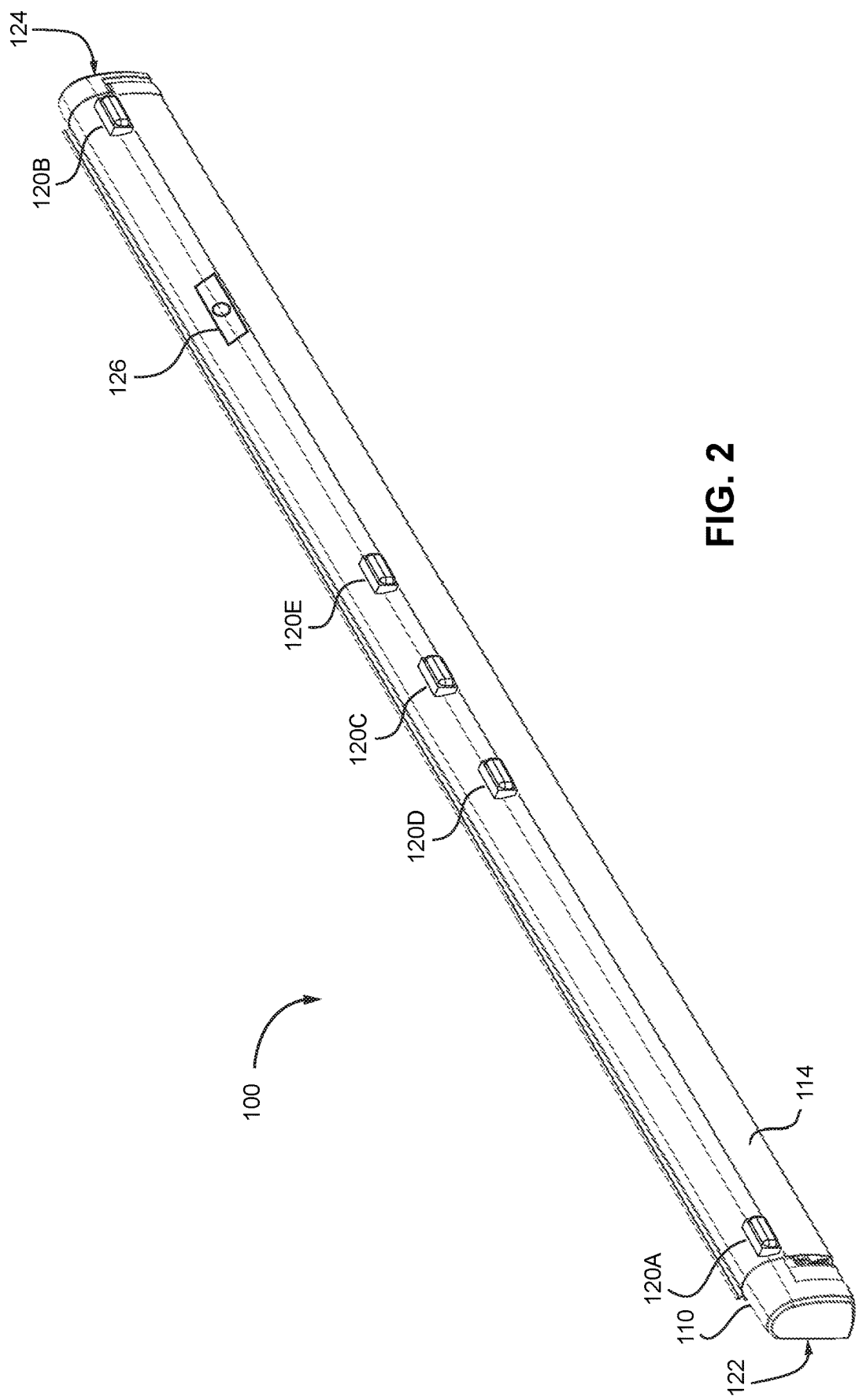
FIG. 2 is a perspective view of an awning system including a housing, an awning extendable from and retractable into the housing, marker lights integrated with the awning housing, and a camera integrated with the awning housing according to the present disclosure.
Figure 3:
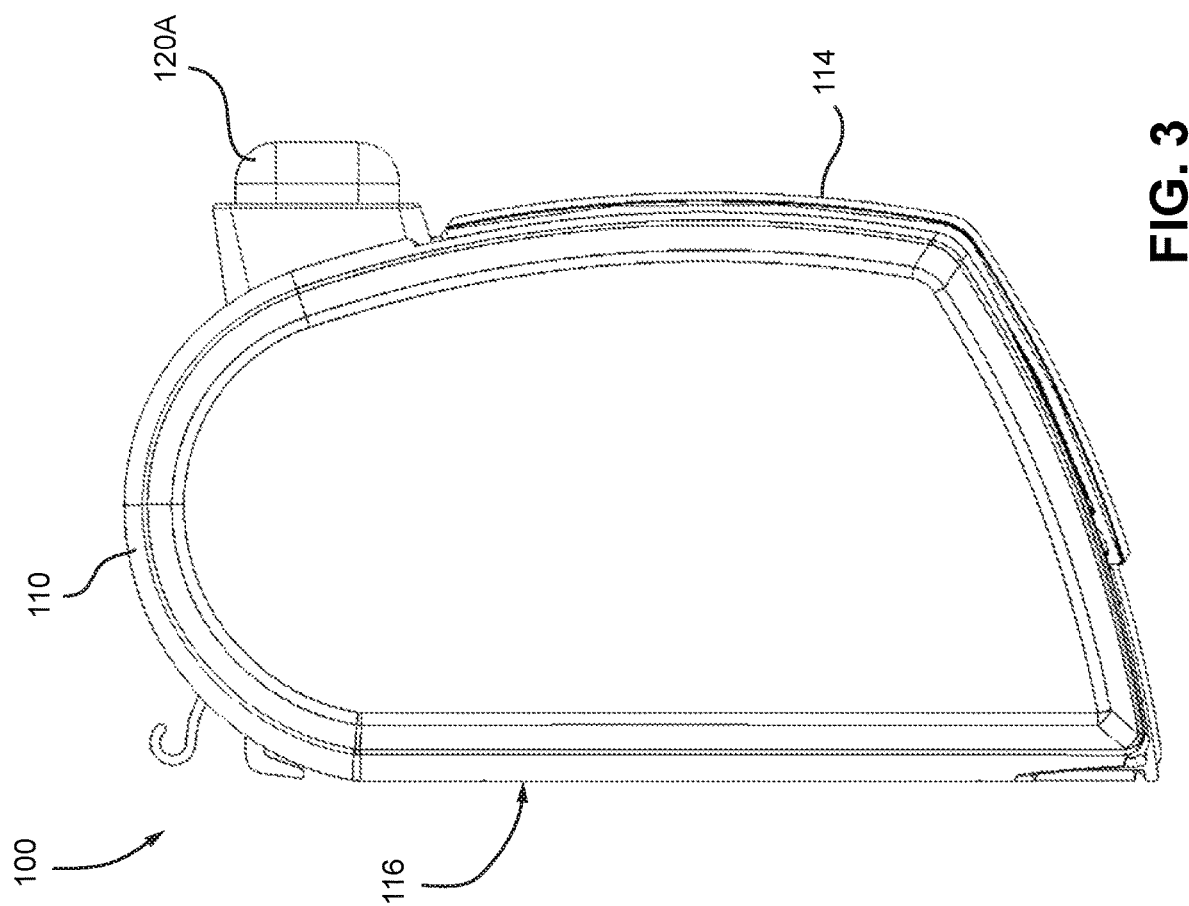
FIG. 3 is a side elevation view of the awing system of FIG. 2.
Figure 4:
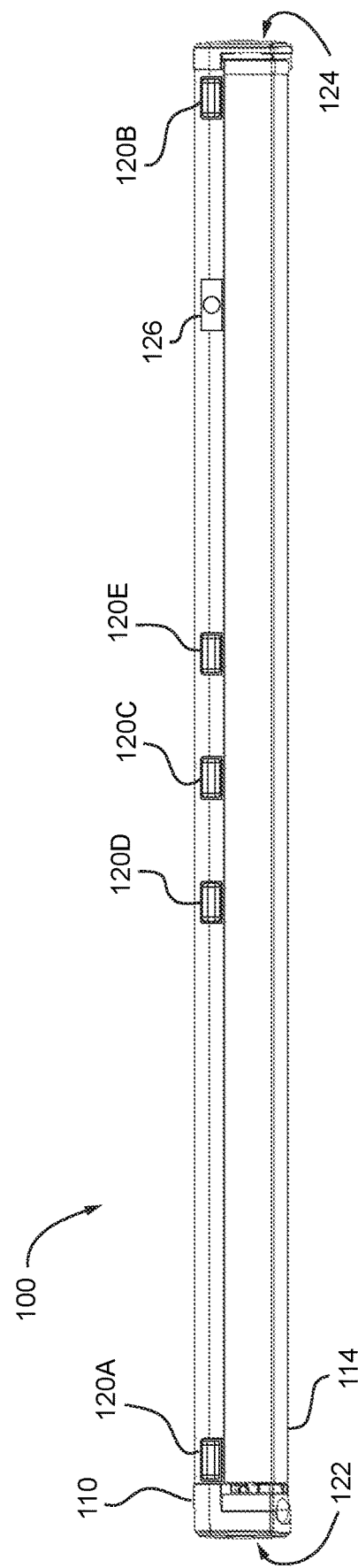
FIG. 4 is a rear elevation view of the awning system of FIG. 2.
Figure 5:
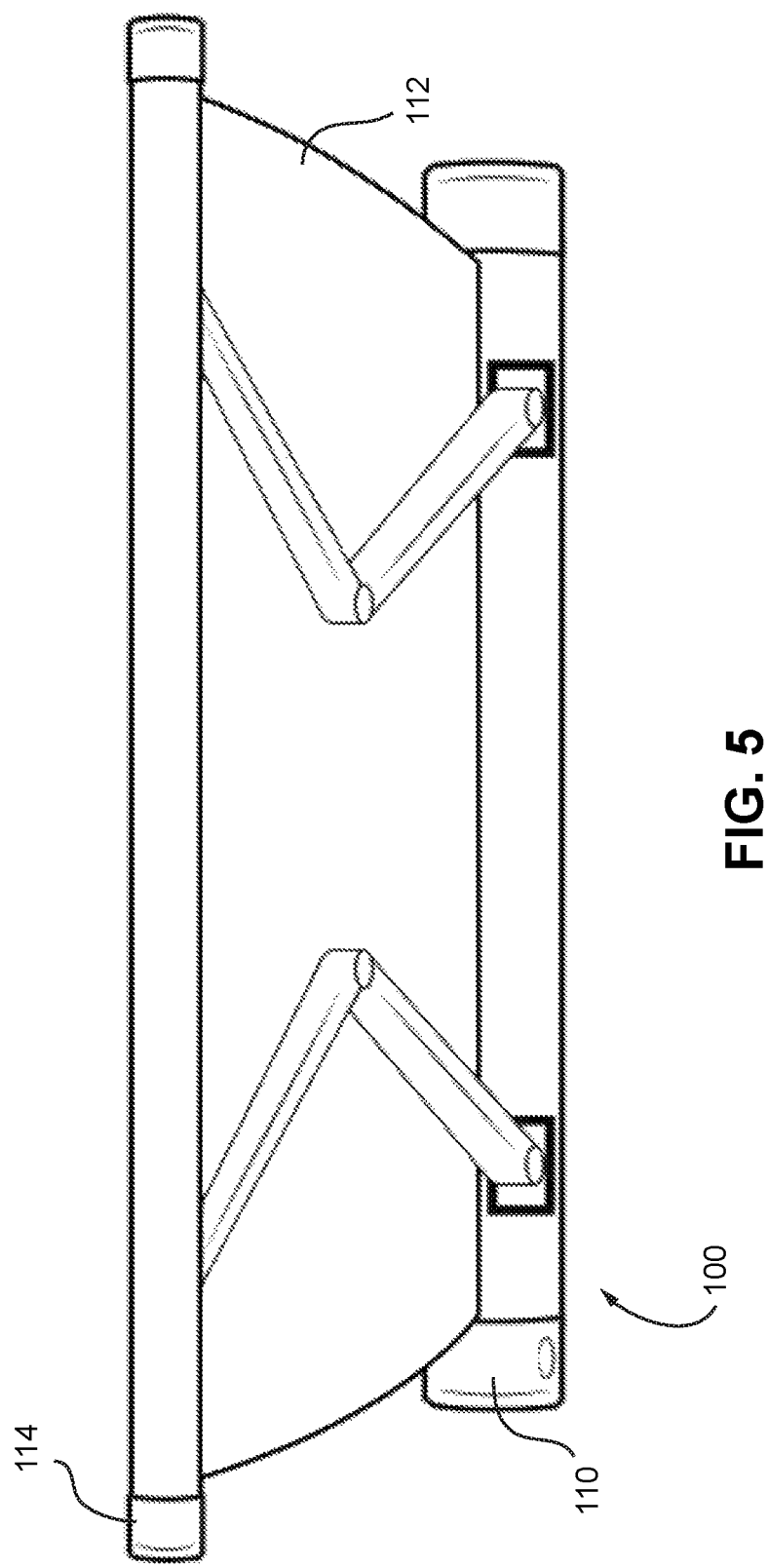
FIG. 5 is perspective view of the awning system of FIG. 2 with the awning deployed from the housing.

FIGS. 2-4, respectively, are perspective, side elevation, and rear elevation views of an awning system 100 according to the present disclosure including a housing 110, an awning canopy 112 (see FIG. 5; not visible in FIGS. 2-4) extendable from and retractable into the housing, marker lights 120A-120E integrated into or otherwise mounted on the housing, and a rear view camera 126 integrated into or otherwise mounted on the housing. An awning end panel 114 may be attached to the free end of the awning canopy 112. In such an embodiment, the awning end panel 114 may be configured to nest with or otherwise cooperate with a corresponding portion of the housing 110 when the awning canopy is retracted so as to give the awning system 110 a finished appearance when the awning canopy 112 is retracted. FIG. 5 is a perspective view of the awning system 100 with the awning canopy 112 deployed from the housing 110.

Figure 6:
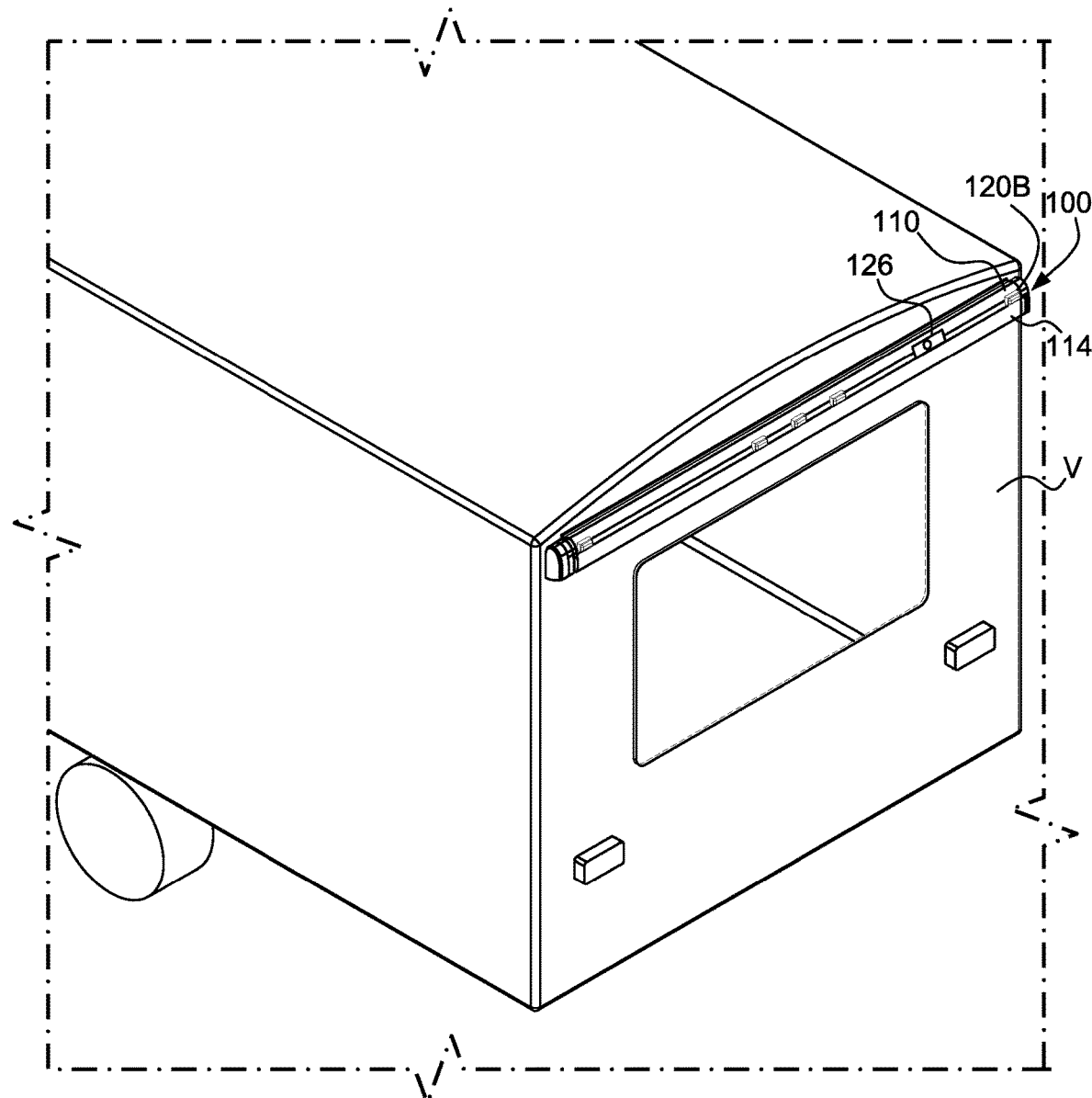
FIG. 6 is a perspective view of the awning system of FIG. 2 attached to the rear of a vehicle.

The housing 110 is configured for mounting to a rear surface of a vehicle near an upper end of the vehicle. A forward-facing surface 116 of the housing 110 may define one or more mounting holes (not shown) for receiving fasteners (not shown) for connecting the housing to the rear surface, for example, the rear of the body, of the vehicle. The housing 110 is configured to extend between a left side of the vehicle and a right side of the vehicle, substantially from the left side of the vehicle to the right side of the vehicle, thus substantially spanning the width of the vehicle. FIG. 6 shows an illustrative installation of the housing 110 to an upper rear of the rear end of a vehicle V. In an embodiment, the housing 110 could be attached to the roof of the vehicle at or near the rear end thereof.

A first marker light 120A is integrated with a surface of the housing 110 near a first (or left) end 122 thereof. For example, the first marker light 120A may be surface mounted to the housing 110, or fully or partially received within an aperture in the housing, or otherwise integrated with the housing. In an embodiment, the first marker light 120A may be located as near as practical to the first end 122 of the housing 110. A second marker light 120B is integrated with a surface of the housing 110 near a second (or right) end 124 thereof. In an embodiment, the second marker light 120B may be located as near as practical to the second end 124 of the housing 110. A third marker light 120C is integrated with a surface of the housing 110 near the center thereof. A fourth marker light 120D is integrated with a surface of the housing 110 left of and near the center portion thereof, adjacent the third marker light 120C. A fifth marker light 120E is integrated with a surface of the housing 110 right of and near the center portion thereof, adjacent the third marker light 120C. The surface of the housing 110 with which the marker lights 120A-120E are integrated may be an upper surface, rear surface, or lower surface. In any event, the marker lights 120A-120E would be integrated with the respective surface of the housing 110 so that light emanating from the marker lights is directed rearwardly when the housing 110 is connected to the rear of the vehicle. If the marker lights 120A-120E are mounted to an upper portion of the housing 110, that is a portion of the housing above the awning canopy, the marker lights 120A-120E might not be visible from the area underneath the awning canopy 112 when the awning canopy is extended or deployed from the housing 110.

The camera 126 may be integrated with the housing 110 at any suitable location from which the camera can be configured to have a field of view covering a designated area behind the rear of the vehicle. For example, the camera 126 may be integrated with a rear-facing surface of the housing 110 anywhere between the first marker light 120A and the fourth marker light 120D, between the second marker light 120B and the fifth marker light 120E, between the fourth marker light 120D and the fifth marker light 120E, or elsewhere. In an embodiment, the camera 126 may be located outboard of the first or second marker light 120A, 120B. In an embodiment, the camera 126 may be integrated with a lower surface of the housing 110 anywhere between the first and second ends of the housing and oriented so that it has the foregoing field of view. In a further embodiment, the camera 126 may be integrated with an upper surface of the housing 110 anywhere between the first and second ends of the housing and oriented so that it has the foregoing field of view. In another embodiment, the camera 126 may be integrated with a left or right end surface 122, 124 of the housing 110 and oriented so that it has the foregoing field of view.

The camera 126 may be integrated with the housing 110 so that its field of view can be adjusted as desired. For example, the camera 126 may be set into a gimbal mount (not shown) integrated into the housing 110, the gimbal mount enabling adjustment of the camera and its field of view about one, two, or three axes. In an embodiment, the camera 126 may be integrated into the housing 110 in a fixed or adjustable manner.

The housing 110 may enclose wiring (for example, in the form of a wiring harness) (not shown) connected to the marker lights 120A-120E and connectable to a source of power for selectively energizing and illuminating the marker lights, and/or wiring connecting the camera 126 to a source of power and to a monitor (not shown). The monitor (not shown) may be located, for example, on the vehicle's dashboard or elsewhere in the vehicle's cockpit. The housing 110 may define an aperture (not shown) on the forward-facing surface 116 thereof (or elsewhere) configured to allow the wiring to pass therethrough. A grommet (not shown) may be disposed within the aperture for protecting wiring passing therethrough.

In use, the housing 110 may be attached to the rear surface, for example, the rear bodywork, of a vehicle as near as practical to the top of the vehicle, with the first end 122 of the housing 110 as near practical to the left side of the vehicle, and the second end 124 of the housing as near practical to the right side of the vehicle. For example, as shown in FIG. 6, the housing 110 may be attached to the rear bodywork of an RV V. With the housing 110 so installed to the vehicle, the marker lights 120A-120E may be as near as practical to the top of the vehicle, the first marker light 120A may be as near as practical to the left side of the vehicle, the second marker light 120B may be as near as practical to the right side of the vehicle, and the third through fifth marker lights 120C, 120D, 120E may be near the center of the vehicle.

The marker lights 120A-120E may be connected to a source of electrical power (not shown) for energizing and illuminating the marker lights. Typically, the marker lights 120A-120E would be connected to the source of electrical power through an intervening switch controlling the vehicle's other running lights (for example, its headlights and taillights) so that the marker lights may be selectively energized and illuminated.

The camera 126 may be controlled by a switch so that it may be activated automatically, for example, when the vehicle's reverse gear or an associated tow vehicle's reverse gear is engaged. An override switch (not shown) could be provided to enable a user to activate or disable the camera 126 on demand, regardless of whether the vehicle's (or tow vehicle's) reverse gear is engaged.

In an embodiment, the housing 110 may be provided with the marker lights 120A-120E but not the camera 126. In another embodiment, the housing 110 may be provided with the camera 126 but not the marker lights 120A-120E.

Certain illustrative embodiments are shown and described herein. Features disclosed in connection with a given embodiment may be incorporated into another embodiment to the greatest extent possible. The foregoing embodiments are not intended to limit the scope of the invention as defined by the appended claims.

The invention claimed is:

1. An awning system, comprising:
a housing configured for attachment to a rear-facing surface of a vehicle;
an awning canopy extendable from and retractable into the housing, wherein the awning canopy is extendable in an extension direction; and
a plurality of marker lights integrated with a surface of the housing, a first of the marker lights adjacent a first end of the housing, a second of the marker lights adjacent a second end of the housing, and a third of the marker lights intermediate the first of the marker lights and the second of the marker lights, wherein the marker lights are oriented and configured to face the extension direction, and wherein the marker lights are integrated with the housing below the awning canopy.

2. The awning system of claim 1 wherein the marker lights are integrated with the housing above the awning canopy.

3. The awning system of claim 1 further comprising a camera integrated with the housing, the camera having a field of view covering an area extending rearwardly from the vehicle and below the awning canopy.

4. The awning system of claim 3 wherein the camera is integrated with a rear-facing surface of the housing above the awning canopy.

5. The awning system of claim 3 wherein the camera is integrated with a rear facing surface of the housing below the awning canopy.

6. The awning system of claim 3 wherein the camera is integrated with the housing below the awning canopy.

7. The awning system of claim 3 further comprising a wiring harness connected to the marker lights and to the camera, a portion of the wiring harness enclosed within the housing.

8. The awning system of claim 1 further comprising a wiring harness connected to the marker lights, a portion of the wiring harness enclosed within the housing.

9. An awning system, comprising:
a housing configured for attachment to a rear-facing surface of a vehicle;
an awning canopy extendable from and retractable into the housing;
a plurality of marker lights integrated with a surface of the housing, a first of the marker lights adjacent a first end of the housing, a second of the marker lights adjacent a second end of the housing, and a third of the marker lights intermediate the first of the marker lights and the second of the marker lights; and
a camera integrated with the housing, the camera having a field of view covering an area extending rearwardly from the vehicle and below the awning canopy, wherein the camera is integrated with the housing through an intervening gimbal mount.

10. An awning system, comprising:
a housing configured for attachment to a rear-facing surface of a vehicle;
an awning canopy extendable from and retractable into the housing;
a camera integrated with the housing, the camera having a field of view covering an area extending rearwardly from the vehicle and below the awning canopy; and
an awning end panel attached to a free end of the awning canopy, the awning end panel nesting into engagement with the housing when the awning canopy is retracted into the housing.

11. The awning system of claim 10 wherein the camera is integrated with a rear-facing surface of the housing above the awning canopy.

12. The awning system of claim 10 wherein the camera is integrated with a rear facing surface of the housing below the awning canopy.

13. The awning system of claim 10 wherein the camera is integrated with the housing below the awning canopy.

14. The awning system of claim 10 further comprising a plurality of marker lights integrated with the housing, and a wiring harness connected to the marker lights and to the camera, a portion of the wiring harness enclosed within the housing.

15. The awning system of claim 10 wherein the camera is integrated with the housing through an intervening gimbal mount.

* * * * *